US012425116B2

(12) United States Patent
Schmid

(10) Patent No.: US 12,425,116 B2
(45) Date of Patent: Sep. 23, 2025

(54) SYSTEMS AND METHOD FOR CONSISTENT FM/HD1 DIVERSITY DELAY

(71) Applicant: Nautel Limited, Hackett's Cove (CA)

(72) Inventor: Philipp Schmid, Hackett's Cove (CA)

(73) Assignee: NAUTEL LIMITED, Hackett's Cove (CA)

( * ) Notice: Subject to any disclaimer, the term of this patent is extended or adjusted under 35 U.S.C. 154(b) by 390 days.

(21) Appl. No.: 17/887,993

(22) Filed: Aug. 15, 2022

(65) Prior Publication Data

US 2023/0046981 A1 Feb. 16, 2023

Related U.S. Application Data

(60) Provisional application No. 63/232,729, filed on Aug. 13, 2021.

(51) Int. Cl.
*H04H 20/30* (2008.01)
*G10L 19/16* (2013.01)
(Continued)

(52) U.S. Cl.
CPC ........... *H04H 20/30* (2013.01); *G10L 19/167* (2013.01); *G10L 19/24* (2013.01); *H04H 20/71* (2013.01)

(58) Field of Classification Search
CPC ...... G06F 30/392; G06F 30/398; G06F 30/30; G06F 30/327; G06F 30/27; G06F 2119/12; G06F 30/39; G06F 30/394; G06F 30/3308; G06F 2115/10; G06F 8/41; G06F 2111/02; G06F 8/20; G06F 8/53; G06F 2111/04; G06F 30/31; G06F 30/3953; G06F 2111/08; G06F 2119/06; G06F 30/33; H04H 20/57;
(Continued)

(56) References Cited

U.S. PATENT DOCUMENTS

| | | | | |
|---|---|---|---|---|
| 7,623,833 | B2 * | 11/2009 | Cabrera | H04B 1/0483<br>455/118 |
| 8,279,908 | B2 * | 10/2012 | Iannuzzelli | H04H 20/67<br>375/145 |

(Continued)

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).

(Continued)

*Primary Examiner* — Golam Sorowar
(74) *Attorney, Agent, or Firm* — Jenkins, Taylor & Hunt, P.A.

(57) ABSTRACT

A broadcast system may have less restrictive timing constraints by providing synchronous processing chains for the HD audio portion and the FM audio portion so that no samples are added or removed from when the input audio is first sampled at an input rate and when the signals are combined and output by a digital analog converter operating at an output rate. The signals can be buffered within the synchronous processing paths and the state of the buffer can be used to control the input rate of the sampler. Graceful change over across multiple input sources can be achieved provided all input source input rates are controlled to by the overall output rate and all input sources are phase aligned to produce output symbols at the same time.

21 Claims, 8 Drawing Sheets

(51) Int. Cl.
*G10L 19/24* (2013.01)
*H04H 20/71* (2008.01)

(58) Field of Classification Search
CPC ........ H04H 20/55; H04H 20/30; H04H 20/95; H04H 20/71; H04H 40/18; H04H 60/11; H04H 20/65; H04H 60/72; H04H 40/27; H04H 60/73; H04H 20/46; H04H 20/426; H04H 20/82; H04H 2201/18; H04H 2201/183; H04H 60/00
See application file for complete search history.

(56) References Cited

U.S. PATENT DOCUMENTS

2006/0227814 A1* 10/2006 Iannuzzelli ............ H04H 20/30 370/516
2016/0182171 A1* 6/2016 Milbar ................... H04H 20/06 375/259
2017/0041129 A1* 2/2017 Nekhamkin ............ H04L 12/18
2017/0179899 A1* 6/2017 Olochwoszcz ....... G10L 19/167
2018/0174569 A1* 6/2018 Gautama .......... G10K 11/17875
2019/0253163 A1* 8/2019 Iannuzzelli ............ H04H 20/95

OTHER PUBLICATIONS

"3rd Generation Partnership Project; Technical Specification Group Services and System Aspects; System architecture for the 5G System (5GS); Stage 2 (Release 17)," 3GPP TS 23.501, V17.5.0, pp. 1-568 (Jun. 2022).

* cited by examiner

FIG. 2 - Prior Art

SYSTEMS AND METHOD FOR CONSISTENT FM/HD1 DIVERSITY DELAY

RELATED APPLICATIONS

The current application claims priority to previously filed U.S. Provisional Application 63/232,729 filed Aug. 13, 2021 and titled "METHOD FOR TIME SYNCHRONIZING THE ENTIRE HD RADIO AIR CHAIN TO ACHIEVE CONSISTENT FM/HD1 DIVERSITY DELAY," the entire contents of which are incorporated herein by reference in their entirety.

TECHNICAL FIELD

The current disclosure relates to HD radio, and in particular to the processing of audio for subsequent transmission.

BACKGROUND

HD Radio technology is based on adding a digital simulcast of a station's main program audio on a separately generated signal broadcast as sidebands to either side of an FM station's allocated spectrum as defined in the In-Band On-Channel (IBOC) standard maintained by the National Radio Systems Committee (NRSC) (NRSC-5-D, 2017), the entire contents of which are incorporated herein by reference in their entirety. HD Radio receiver sets are built to first acquire the FM radio broadcast then blend to the digital simulcast and back when the digital signal is lost. To minimize audible interruption during the blend process the two audio signals must be matched in audio level and more importantly timing to avoid phase cancellation and other audio effects. It has become a significant industry challenge to maintain consistent audio timing across diverse audio paths that may be used for the FM and HD1 audio. The processing of the FM audio and HD1 audio may include audio equipment from audio processors, ratings injection, studio to transmitter links and one or more broadcast transmitters.

FIG. 1 depicts different timing delays between FM and HD1 signals for different sample. FIG. 1 demonstrates how a diversity delay time offset between the FM and HD1 introduces a comb filter effect on the listener audio that can mask or distort frequency content related to the time offset. At a 3 audio sample time offset only frequency content above about 7 kHz is affected with minimal impact on listener perception. With 12 audio samples frequency content in the 2 kHz audio spectrum becomes impacted causing noticeable interruption. At 300 samples or more the comb filter effect becomes very selective only affecting discrete tones in the audio spectrum reducing, but not eliminating, blend artifacts.

To improve the listener experience, HD Radio receivers have now implemented correlation techniques to align the FM and HD1 simulcast within a receiver set. While this solution improves the blend experience of users with these receivers, they themselves are susceptible to delay changes from the broadcast transmission on either the FM or HD1 audio path placing requirements on the broadcast plant to emit consistent throughput delays on both the FM and HD1 even if they are not perfectly aligned to each other.

Detailed industry guidelines (NRSC-G203, 2017), the entire contents of which are incorporated herein by reference in their entirety, have been developed for best practice implementations to achieve consistent delays across all broadcast audio paths using GPS based 10 MHz synchronization which necessitates purpose built embedded hardware.

FIG. 2 depicts a typical system block diagram in today's IBOC broadcast systems architecture for the most common hybrid low level combined method of broadcasting FM and HD Radio. A person skilled in the art may see various changes to the overall topology that ultimately do not materially change the limitations of this design such as the location of the diversity delay buffer or audio processors.

A station's main audio feed 202 typically originates at the studio but can also be delivered to a transmitter site or other locations via a number of audio link options including satellite. This single audio feed needs to be split by an audio splitter 204 and fed to two separate audio processors, one for the HD1 audio 206 and one for the FM audio 208. The audio splitter 204, and processors 206, 208 may be provided as separate components or may be provided possibly within a single dual output audio processor. Not shown in FIG. 2, often these audio processors include patch points to bring out the audio to an external watermarking system to gather ratings information further adding sources for delay differences between the two processing paths. Separate audio processor implementations can introduce varying delay elements contributing to the overall diversity delay difference since the audio is already split at this point. Audio can still be at an arbitrary sample rate or format at this point as the audio in each path gets rate converted in an asynchronous sample rate converter (ASRC), by an HD1 ASRC 212 for the HD audio and by an FM ASRC 228 for the FM audio after some type of audio link 220 to the transmitter for the FM audio. Conceptually, the FM ASRC 228 could also be an ADC sampling analog audio or even a composite MPX ADC that also produces digital samples given a digital clock input.

The HD1 ASRC 212 is typically part of the exporter function 210 either offered as a 3$^{rd}$ generation exporter or a 4$^{th}$ generation combined importer/exporter product. The exporter 210 transforms a fixed set of audio samples (i.e. 2048 stereo samples) into a bit stream using the HD1 encoder 214 that can be combined with other HD Radio data streams in a data multiplexor 216, sent to the transmitter via an IP link 218 using, for example, the exporter to exgine (E2X) protocol. A packet buffer 224 in the transmitter's digital exciter 222 receives the E2X packets and forwards them to an IBOC modulator 226 to be transformed into an Orthogonal Frequency Division Multiplexed (OFDM) waveform.

The FM audio is rate converted to the exciters internal sample rate using the FM ASRC 228 and the samples can be delayed in a diversity delay buffer 240 in order to time-align the FM audio with the HD1 audio. This delay buffer 240 can optionally also be located along other portions of the FM audio chain, such as the FM audio processor 208. The FM audio is modulated into an FM in-phase/quadrature (I/Q) waveform in the FM modulator 230 at the same sample rate as the IBOC waveform I/Q so that the two waveforms can be combined either in a simple adder 232 or a more sophisticated peak-to-average power reduction (PAPR) process. While conceptually similar, a PAPR process is complicated by the fact that a larger time domain portion of the signal needs to be precisely aligned typically at a minimum of a single IBOC symbol duration, while a simple adder works on a sample-by-sample basis.

The Digital-to-Analog (DAC) converter 234 may, for simplicity, comprises digital up-conversion, as well as, channel modulation of the combined FM+IBOC waveform from the adder 232 to produce the final RF waveforms to be amplified for transmission 248. A DAC requires a high precision timing reference to faithfully reproduce digital samples in the analog domain at above the Nyquist rate of the signal to be generated; often at hundreds of MHz or more. This crucial timing reference is the heartbeat of the digital exciter and is subject to numerous stability and accuracy specifications. The DAC is the output of the two synchronous signal chains: one for the analog FM signal starting at the FM ASRC 228 and a second one for the HD1 signal starting at the HD1 ASRC 212. A synchronous signal chain is defined as a signal chain connecting various processing blocks where each sample or batch of samples are precisely related through fractions each representing the same duration of time and no samples or batch of samples are arbitrarily dropped or added. For example, 128 HD1 audio samples at a 44.1 kHz sample rate representing ~2.9 ms transform into 2160 OFDM I/Q samples at an IBOC rate of 744187.5 Hz or one complete IBOC symbol for an equal amount of time of ~2.9 ms with other transformations, such as audio coding along the way.

A synchronous signal chain is well suited for digital implementation since consistent throughput delay can be guaranteed end-to-end if the input to the chain produces time batches at the same rate as the output of the chain consumes time batches. The overall throughput delay is then governed either by pre-seeding buffer levels or by starting the output a fixed time after the input and letting intermediate buffers fill up. To achieve consistent throughput delay a consistent reset strategy of all processing blocks and enabling of input and output should be used; otherwise, the system may experience varying delays on each system restart. The precise timing as to when intermediate processing steps are taken do not matter provided buffers in between processing blocks do not under or overflow. The two ASRCs 212, 228 at the input break the synchronous signal chain as the input and output sample rates are not governed by a fixed sample ratio, instead a sample rate estimation loop adaptively predicts the input to output ratio while trying to maintain constant group delay from input to output. This allows arbitrary sample rates at the input or output of an ASRC.

Current methods exhibit a dual input synchronous signal chain that combines to a single output connection across the IP link 218. The only way consistent throughput delay can be achieved across this limited synchronous chain is by ensuring all producers, namely the HD1 ASRC 212 and the FM ASRC 228 operate in lock step with the single consumer, or the DAC 234. A method currently exists to adapt the digital exciter clock 222 rate to follow the clock rate in the exporter 210 by measuring the rate of incoming E2X packets. While this method has been shown to work it requires large amounts of time averaging in order to minimize the impact of packet jitter across the IP link 218 leading to a long time constant of the timing control loop. This means that the transmitter digital exciter 222 and exporter 210 will temporarily operate at differing frequencies. For example, an instantaneous frequency error of 5 ppm produces a time error of 40 us in a diversity delay buffer 240 set at 8 seconds nominally. While this contributes to the overall diversity delay error, the bigger concern is the integrated error that while bounded overall can create larger swings in error as shown in FIG. 6 that captured 4 audio samples (or 91 us) in such a system with nearly ideal networking conditions. Larger swings are common under adverse packet jitter conditions.

Industry best practice (NRSC-G203, 2017), the entire contents of which are incorporated herein by reference in their entirety, recommends using a GPS 242 disciplined 10 MHz clock sources 244, 246 to effectively control all input and output nodes of the synchronous signal chain. The exciter utilizes a phase locked loop 236 to create related clock rates for both the DAC 234 and the FM ASRC 228 but does not control the rate of the HD1 ASRC 212 as it is a separate system component that may not be co-located. Even if synchronous operation can be achieved in this signal chain, the chain does not cover the portion of the signal chain from the audio splitter 204 to the HD1 ASRC 212 and FM ASRC 228 that can introduce sources of diversity delay slip. Following best practice, consistent throughput delay can often only be achieved when collocating exporter and exciter to ensure identical clock sources. Also this limited feed forward signal chain without an overarching reset strategy will always lead to arbitrary start-up states resulting in varying diversity delay on a reset of any part of the synchronous signal chain.

An improved system and method for maintaining time alignment of HD and FM audio signals is desirable.

SUMMARY

In accordance with the present disclosure there is provided a HD radio broadcast system comprising: an audio encoder comprising: an input sampler operating at a controllable input rate, the sampled input audio feed used to generate two audio signals for synchronous processing by respective synchronous audio processing paths; and a transmitter for transmitting two audio streams from the output of the synchronous audio processing paths over a data link; a transmitter exciter comprising: first and second modulators each for modulating respective audio streams from the two audio streams transmitted over the data link; an output device operating at an output rate to output a transmission signal based on a combination of the modulated two audio streams; and a buffer for the two audio streams, wherein no samples are added to or removed from the two audio streams between the input sampler and when the two streams are combined together, and wherein a state of the buffer is used to control the input rate of the audio encoder.

In a further embodiment of the broadcast system, the audio encoder further comprises an audio splitter for generating the two audio signals from the output of the input sampler.

In a further embodiment of the broadcast system, the two synchronous audio processing paths comprising an FM audio processing path and an HD audio processing path.

In a further embodiment of the broadcast system, the FM audio processing path comprises an FM audio processor and an FM encoder.

In a further embodiment of the broadcast system, the FM audio processing path further comprises an FM MPX generator.

In a further embodiment of the broadcast system, the HD audio processing path comprises an HD audio processor and an HD encoder.

In a further embodiment of the broadcast system, the HD audio processing path further comprises a data multiplexor.

In a further embodiment of the broadcast system, the data link comprises an internet protocol (IP) link.

In a further embodiment of the broadcast system, the audio encoder further comprises a sync handler receiving sync data from the transmitter exciter, the sync handler controlling the input rate of the sampler based on the sync data.

In a further embodiment of the broadcast system, the transmitter exciter further comprises a sync generating for generating and transmitting the sync data based on the state of the buffer.

In a further embodiment of the broadcast system, the first and second modulators comprise in-phase quadrature (IQ) modulators.

In a further embodiment of the broadcast system, the transmitter exciter further comprises a combiner for combining the two modulated audio streams.

In a further embodiment of the broadcast system, the combiner combines the two modulated audio streams using a peak-to-average power reduction (PAPR) process.

In a further embodiment of the broadcast system, the buffer is located before the first and second modulators.

In a further embodiment of the broadcast system, the buffer is located between the first and second modulators and the combiner.

In a further embodiment of the broadcast system, the buffer is located after the combiner.

In a further embodiment of the broadcast system, the first modulator comprises an IBOC modulator and the second modulator comprises an FM modulator.

In a further embodiment of the broadcast system, the FM processing path further comprises a diversity delay buffer.

In a further embodiment of the broadcast system, the output device comprises a digital to analog converter (DAC).

In a further embodiment of the broadcast system, the broadcast system further comprises: one or more additional audio encoders each having a respective input sampler operating at a controllable input rate; and wherein the transmitter exciter further comprises: a respective buffer and sync generator for each of the one or more additional audio encoders; and an encoder selector for selecting an encoder feed for modulating.

In a further embodiment of the broadcast system, the buffer of the audio encoder and the buffers of the one or more additional audio encoders are controlled such as to align transmission frames to an active audio encoder to allow for graceful changeover.

In accordance with the present disclosure there is further provided a FM+HD audio encoder comprising: an input sampler operating at an input rate, the sampled input audio feed used to generate two audio signals for synchronous processing by respective synchronous audio processing paths; a transmitter for transmitting two audio streams from the output of the synchronous audio processing paths over a data link; and a sync handler receiving sync data over the data link and controlling the input rate of the input sampler based on the sync data.

In accordance with the present disclosure there is further provided a transmitter exciter for an HD radio system comprising: first and second modulators each for modulating respective audio streams from two audio streams received over a data link; an output device operating at an output rate to output a transmission signal based on a combination of the modulated two audio streams; a buffer for the two audio streams; and a sync generator for generating sync data for use in controlling an input rate of a sampler from a state of the buffer and transmitting the sync data over the data link.

In accordance with the present disclosure there is further provided a method of generating an HD radio signal for broadcast comprising: sampling a main audio feed at an input rate; processing the sampled main audio feed by a HD audio processing path and by an FM audio processing path to generate an HD audio signal and an FM audio signal respectively; transmitting the HD audio signal and the FM audio signal over a data link; receiving the HD audio signal and the FM audio signal at a transmitter exciter; modulating the HD audio signal using an IBOC modulator to generate a modulated HD audio signal; modulating the FM audio signal using an FM modulator to generate a modulated FM audio signal; combining the modulated FM audio signal and the modulated HD audio signal into a combined FM-HD audio signal generating an analog audio signal for transmission using an output device operating at an output rate; buffering in at least one buffer of the audio signals at a point between sampling and generating the analog audio signal; and controlling the input rate based on a state of the at least one buffer.

BRIEF DESCRIPTION OF THE DRAWINGS

In the accompanying drawings, which illustrate one or more example embodiments.

DETAILED DESCRIPTION

An HD radio system architecture is described herein that uses a single ASRC to sample the audio feed prior to splitting the signal into respective synchronous processing paths for the HD audio signal and the FM audio signal. The processed signals can be transmitted over a data link such as an IP link and combined together and output for transmission by a DAC. The processing of the audio signals, from when the main feed audio signal is sampled and output by the ASRC to when the signals are input to DAC, is synchronous so that no additional samples are added into, or removed from the respective audio signals. The clock rate of the input ASRC and the output DAC are independent of each other. A buffer may be used to ensure that the DAC doesn't overrun, or under run, the signals. The buffer state may be used to control the operation of the ASRC in order to ensure that the buffer remains full without risk of overflowing.

The system architecture ensures synchronization by coupling and controlling both the FM and HD1 audio from split in the audio processor until the signal paths are recombined in the broadcast transmitter's exciter. The two audio paths are kept in lock step throughout all transformations from encoding to signal modulation. In this architecture the system heartbeat is moved from the exporter encoder to the transmitter exciter. The overall throughput delay is controlled through hand shaking and backpressure, ensuring no samples are lost or added all the way to the split in the audio processor. This also governs the processing rates at the exporter.

Figure 1:
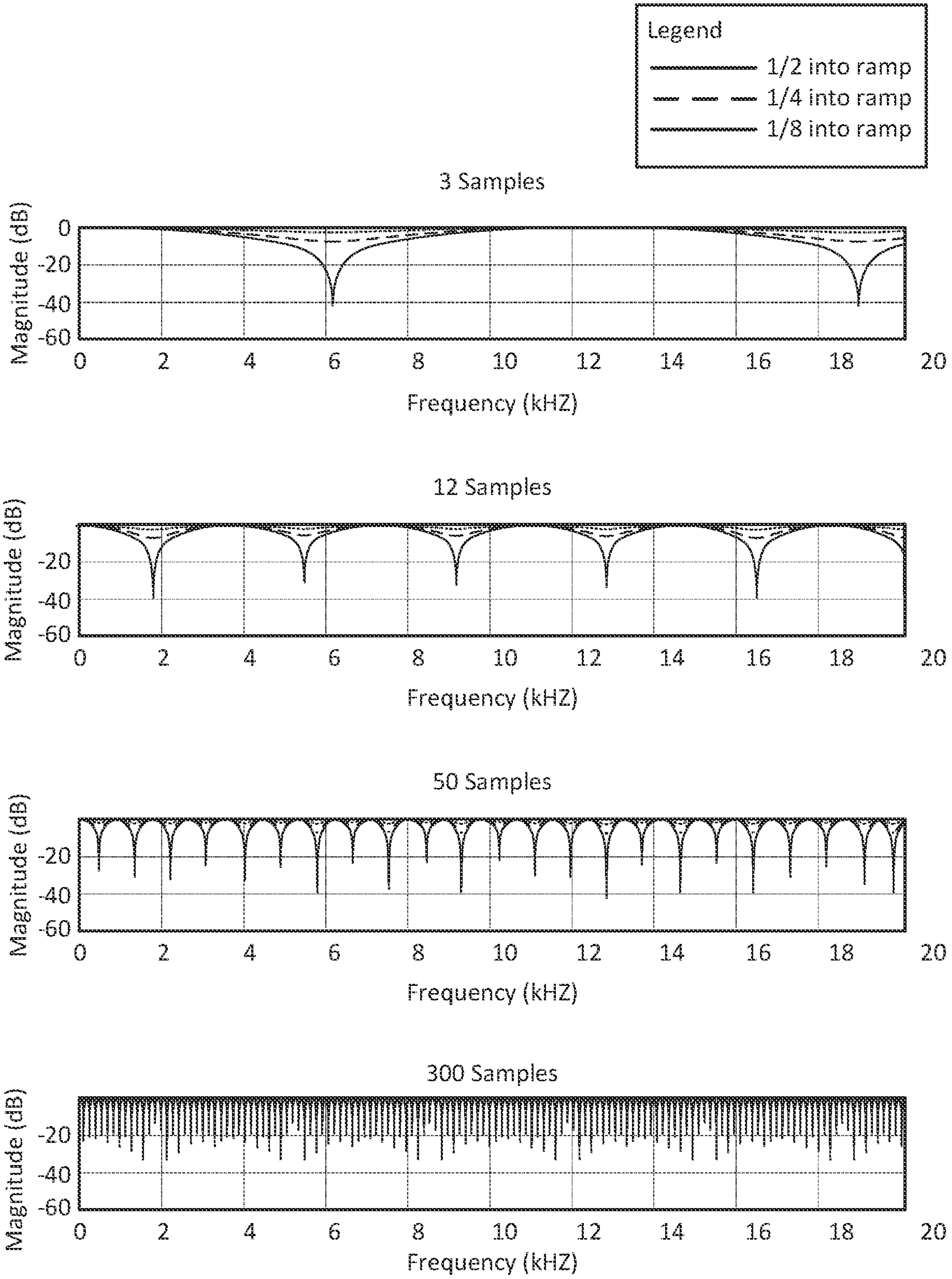
FIG. 1 depicts different timing delays between FM and HD1 signals for different sample.
Figure 2:
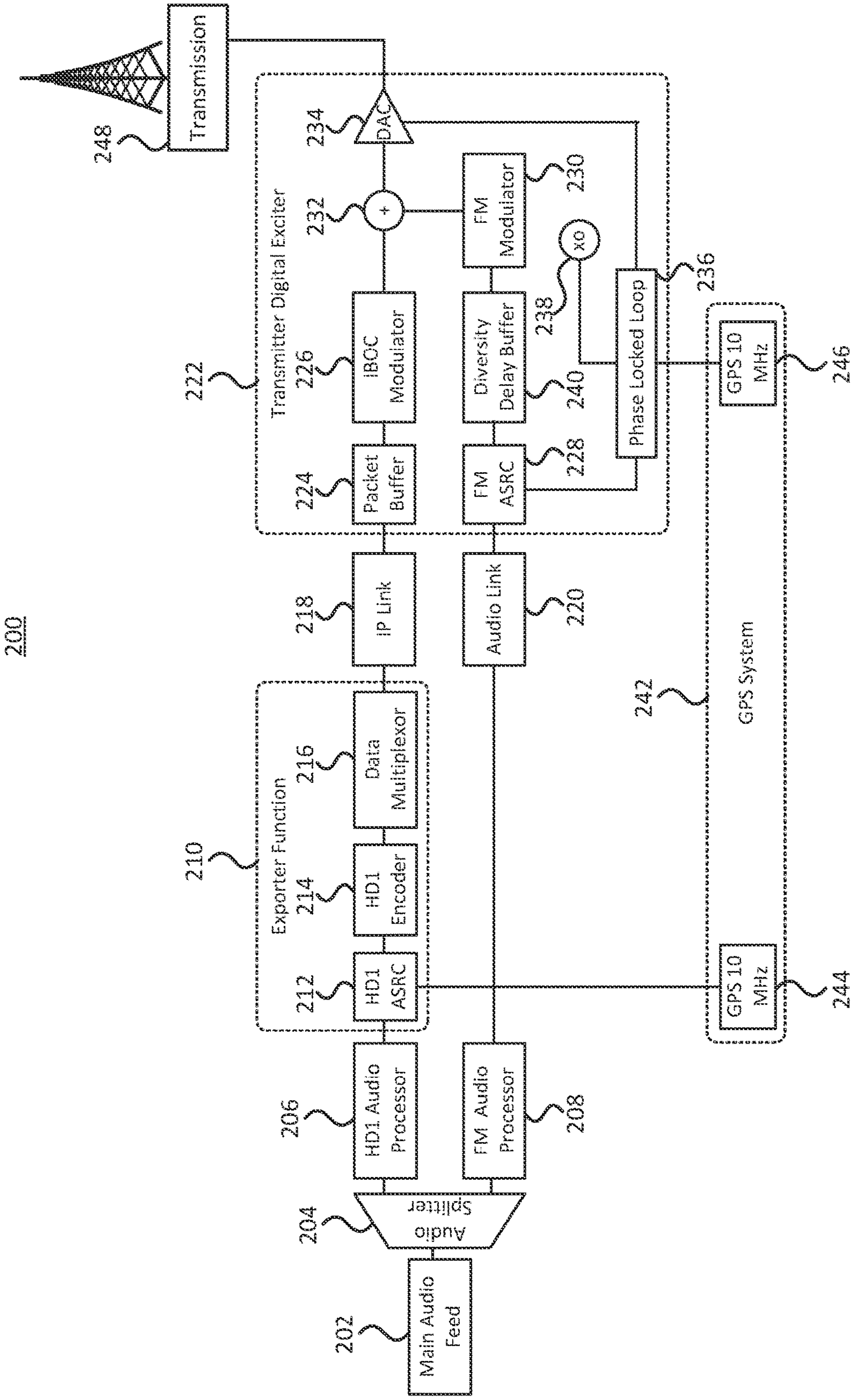
FIG. 2 depicts a typical system blocks in today's IBOC broadcast systems architecture.
Figure 3:
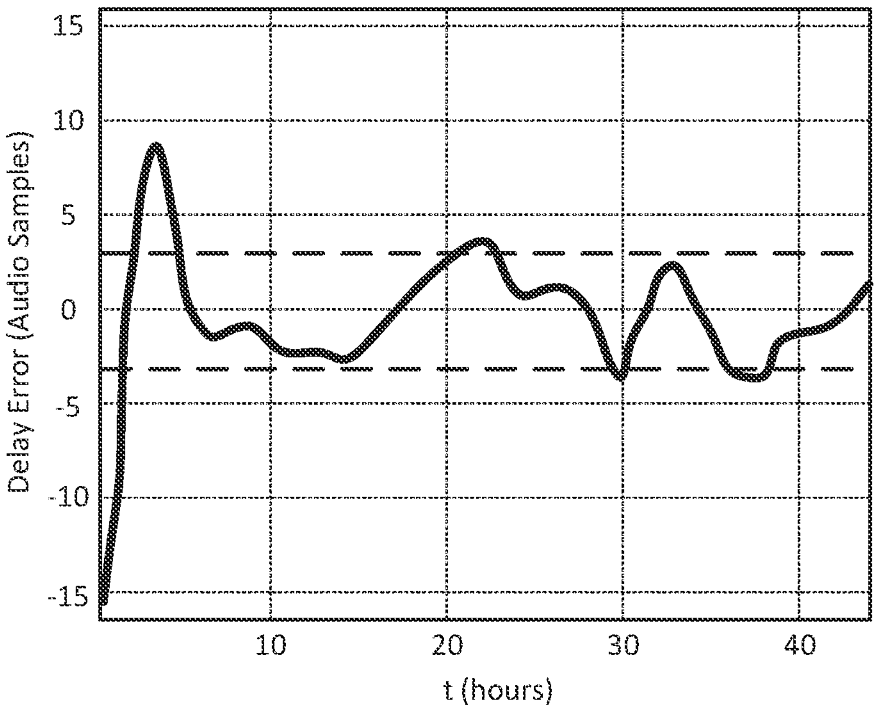
FIG. 3 is a graph of the delay error over time.
Figure 4:
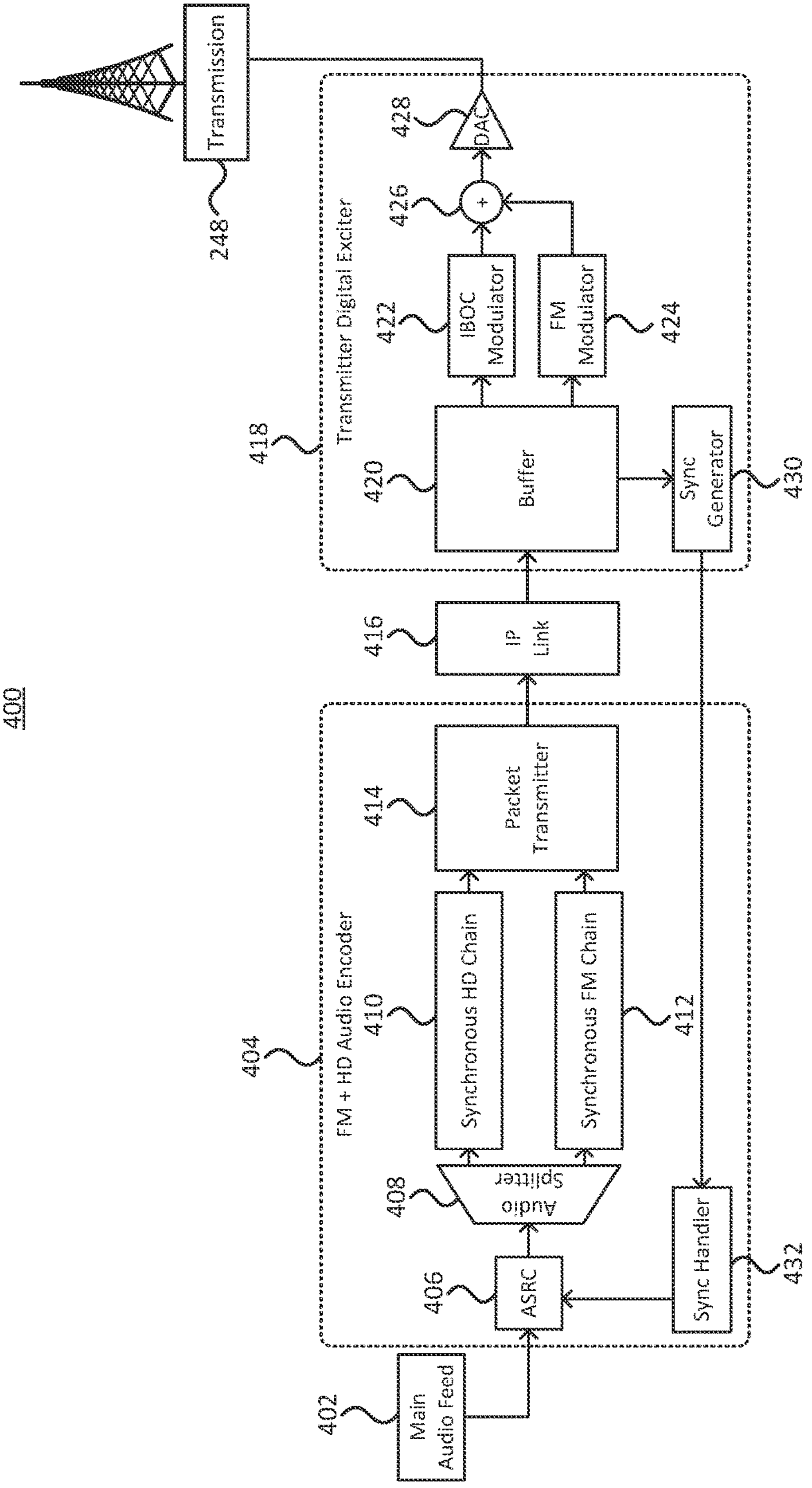
FIG. 4 depicts an IBOC broadcast systems architecture with improved synchronization.

FIG. FIG. 4 depicts an IBOC broadcast systems architecture with improved synchronization. The system 400 is broadly similar to that depicted in FIG. 2 above in that it receives a main audio feed and prepares it for transmission as an HD radio signal. However, the system 400 feeds the main audio signal 402 to the encoder 404 at a single ASRC 406 for sampling before splitting the sampled audio by an audio splitter 408. The split audio signals are provided to respective synchronous processing chains for the HD portion 410 and the FM portion 412. The processed signals can be transmitted by a packet transmitter 414 over an IP link 416.

The signals are transmitted over the IP link 416 to the transmitter digital exciter 418. The packets are received and may be buffered 420 before feeding the respective signals to an IBOC modulator 422 and FM modulator 424 which generate the in-phase/quadrature (I/Q) signals for the HD audio and the FM audio. The modulated signals can be combined together 426, possible using a simple adder as depicted or a more complex peak-to average power reduction (PAPR) process. Regardless of how the signals are combined, the combined signal is provided to an output device 428 that operated at an output rate to generate the signal for application and transmission 248 over the air. As depicted in FIG. 4, the output device 428 may comprise a digital to analog converter (DAC) although other devices for generating the signal for transmission may be provided.

The processing of the signals between the ASRC 406 and the DAC 428 is synchronous and each chain is in sync with the other. Accordingly the rate of the DAC and the ASRC need to be controlled so that the buffer does not overflow or underflow. The DAC 428 may operate at a set rate and the input rate of the ASRC may be controlled by a sync handler 432 that can cause the ASRC to speed up and provide more samples to the buffer or to slow down and provide fewer samples to the buffer. The sync handler may receive information about speeding up or slowing down over the IP link 416 from a sync generator 430 at the transmitter digital exciter 418. The sync generator may monitor the state of the buffer and generate the sync signal based on the status. For example, if the buffer is beginning to fill, such as above half full, ¾ full etc., the sync generator may send information to the sync handler 432 in order to cause the ASRC to slow down. Similarly, if the buffer begins to empty, the sync generator may send information to the sync handler to cause the ASRC to speed up.

By collapsing the two ASRCs 212, 228 of the previous system architecture 200 into a single ASRC 406 as described a synchronous signal chain with a single input and single output can be created. As long as no samples are lost or added in the processing chains, the throughput delay on the FM and HD1 path is always guaranteed no matter the input, or producer, rate of the ASRC and the output, or consumer, rate of the DAC. Where previously a difference in exporter and transmitter exciter rates produced a difference in the FM and HD1 audio delays leading to sub optimal FM to HD1 blending as described above, now a difference of input and output rates only affects the overall end-to-end throughput delay, which may be addressed with use of the buffer 420.

A difference in processing rates between the two systems can still affect a residual error. An 8 s buffer with a 5 ppm clock difference can produce a 40 us delay variance, but only if there is an imbalance of buffering between the two parallel FM and HD1 audio paths. Regardless, such an error is well within established specifications (NRSC, 2017) and demonstrates that the overall system synchronization requirements have been greatly relaxed.

Figure 5:
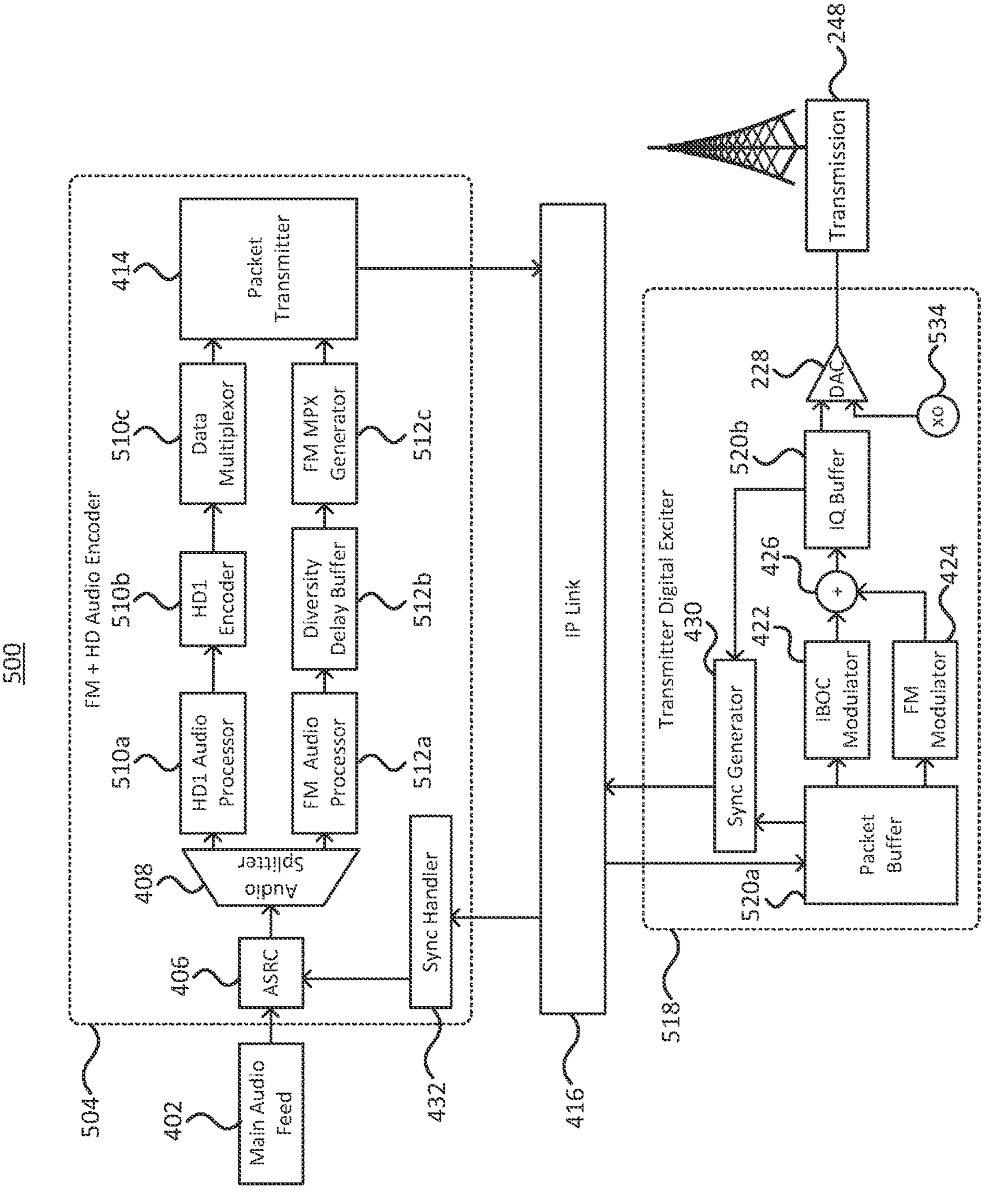
FIG. 5 depicts a further IBOC broadcast systems architecture with improved synchronization.

FIG. 5 depicts a further IBOC broadcast systems architecture with improved synchronization. The system 500 is similar to that depicted in FIG. 4 and similar components are references with similar reference numbers. The system 500 receives a main audio feed 402 at an FM+HD Encoder 504. The main audio feed 402 is provided to an ASRC 406 that samples the signal at a rate, at least partially, controlled by the sync handler 432. The sample audio signal is split by an audio splitter 408 and the signals fed to respective synchronous processing chains for the HD signal and FM signal. The HD processing chain may comprise various processing components including an HD audio processor 510*a*, an HD encoder 510*b* and a data multiplexor 510*c*. The FM processing chain may comprise an FM audio processor 512*a*, and diversity delay buffer 512*b* and an FM MPX generator 512*c*. The signals from each of the processing chains may be provided to a packet transmitter 414 for transmission to the transmitter digital exciter 518 over an IP link 416. The transmitter digital exciter 518 receives the signals and can buffer both signals. The buffering may be applied at different stages in the processing. As depicted the received packets from the IP link may be buffered by a packet buffer 520*a*, or the signals may be buffered after being combined by an IQ buffer 520*b*. Although depicted as being located at the exciter 518, it is possible to incorporate the buffer into the Audio encoder 504. The HD and FM signals are provided to an IBOC modulator 422 and FM modulator 424 respectively which generate respective in-phase/quadrature modulated signals which are combined together, possibly using a simple adder 426 as depicted or using a more complex process such as a Peak-to-Average Power Reduction (PAPR) process. The combined signal is provided to an DAC 228 that may operate at a rate determined by an oscillator 534. The output of the DAC is provided for amplification and transmission 248. While the DAC may operate at a rate determined by the oscillator, the ASRC 406 may operate at a rate determined at least in part by the sync handler 432 that can speed up or slow down the rate of the ASRC. The sync generator 430 may generate the control information for the ASRC rate based on a state of the buffers, which may be either the packet buffer 520*a* or the IQ buffer 520*b*. It will be appreciated that the buffer may be inserted at different locations as long as it does not insert any samples into, or remove any samples from, either the HD and FM signals, or the combined HD and FM signals.

Since audio processing is different for the FM and HD1 audio, this necessitates the respective audio processors 510*a*, 512*a* become part of this synchronous audio chain and operate in a synchronous fashion and can no longer exist as a pure standalone component. The IP link protocol definition can be altered to include both the HD1 audio as well as the FM audio. Both can have various formats, the FM can either be stereo audio or as shown here composite MPX or even FM modulated IQ, the HD1 can either be the E2X protocol or another form carrying the digital information to the modulator, such as the constellation information for each symbol (Gen 5 HD Exciter Link Protocol—Synchronizing FM and IBOC, 2019), the entire contents of which are incorporated herein by reference in their entirety. Linking the FM and HD1 audio across the IP link 416 is not strictly necessary within a synchronous signal chain as described above if the IP link 416 is bi-directional and allows for back pressure flow control on both paths independently; FM and HD1 can be carried across different links or communication channels if they are synchronous signal chains. When back pressure control cannot be provided across uni-directional links, it is of benefit to link the two signal paths. As no feedback path is available in this case, both exporter and exciter must operate on a common clock base that can be established via network timing protocols (IEEE1588, NTP, . . . ) or satellite positioning (GPS, GLONASS, . . . ) traced back to a single global lead clock. Even if both exporter and exciter operate on a single global lead clock overall throughput delay is not guaranteed to be consistent as it depends on how the signal chains start-up with respect to each other. Linking the two signal paths across the IP link in the case of a uni-directional link allows an exciter modulator to start-up synchronously without considering the up-stream signal chains, which relaxes the overall timing requirements as the differential timing cannot slip across the IP link.

As depicted, it is possible to run both the producer, or the ASRC 406 and consumer, or the DAC 228 on independent clocks with introduction of an additional buffer, which could be at either the exciter or the exporter. For example, if the two components can run on independent clocks to within 5 ppm to each other and an additional 20 s buffer is introduced with an initial 10 s level, the system can run for at least 23 days before a buffer reset (and associated on air interruption) is required. While the throughput delay can vary by +−10 s the differential diversity delay is minimally impacted. A good reset strategy based on buffer monitoring can be provided to ensure resets are handled gracefully.

As described the ASRC 406 rate can be governed, indirectly, by the rate of the exciter DAC through a feed-back loop using a bi-directional IP link or other means to convey the feedback from the sync generator to the sync handler. One method to accomplish the feedback is by monitoring either the packet buffer 520*a* or the I/Q buffer 520*b* against a predetermined target fill level (typically halfway). If the fill level is below the target, the sync generator 430 can issue a request to the sync handler 432 to adjust ASRC 406 rates to provide one or more samples over and above what the ASRC would have normally produced on its own time base. For example, the audio encoder will request audio samples on a regular basis based on its local reference clock. Upon request, the audio encoder can ask for two audio samples at the same time or skip an audio sample request. Practically this can be implemented by counting samples against a local time base and adjusting the target accordingly. The generator 430 can long term average the buffer fill level and may ask for an increased number of samples as the buffer level drops or vice versa ask for samples to be removed proportionally to the buffer level being above the target level. This method allows for a high precision crystal oscillator 534 to be employed in the transmitter exciter, which is required at the transmitter anyway to ensure best possible signal parameters. The audio encoder 504 can rely on a lower grade clock sources with an absolute frequency error that can now be compensated for using this feedback method between the sync handler and sync generator provided the clock source is reasonably stable. Note in this method is that no audio or signal samples are removed or added but rather the rate of the input ASRC 406 is governed such as to spread the signal timing over many samples.

Using the system architecture above, the differential delay is minimally impacted and the throughput delay is governed by the integrated timing error between the input (producer) and output (consumer) clocks.

Figure 6:
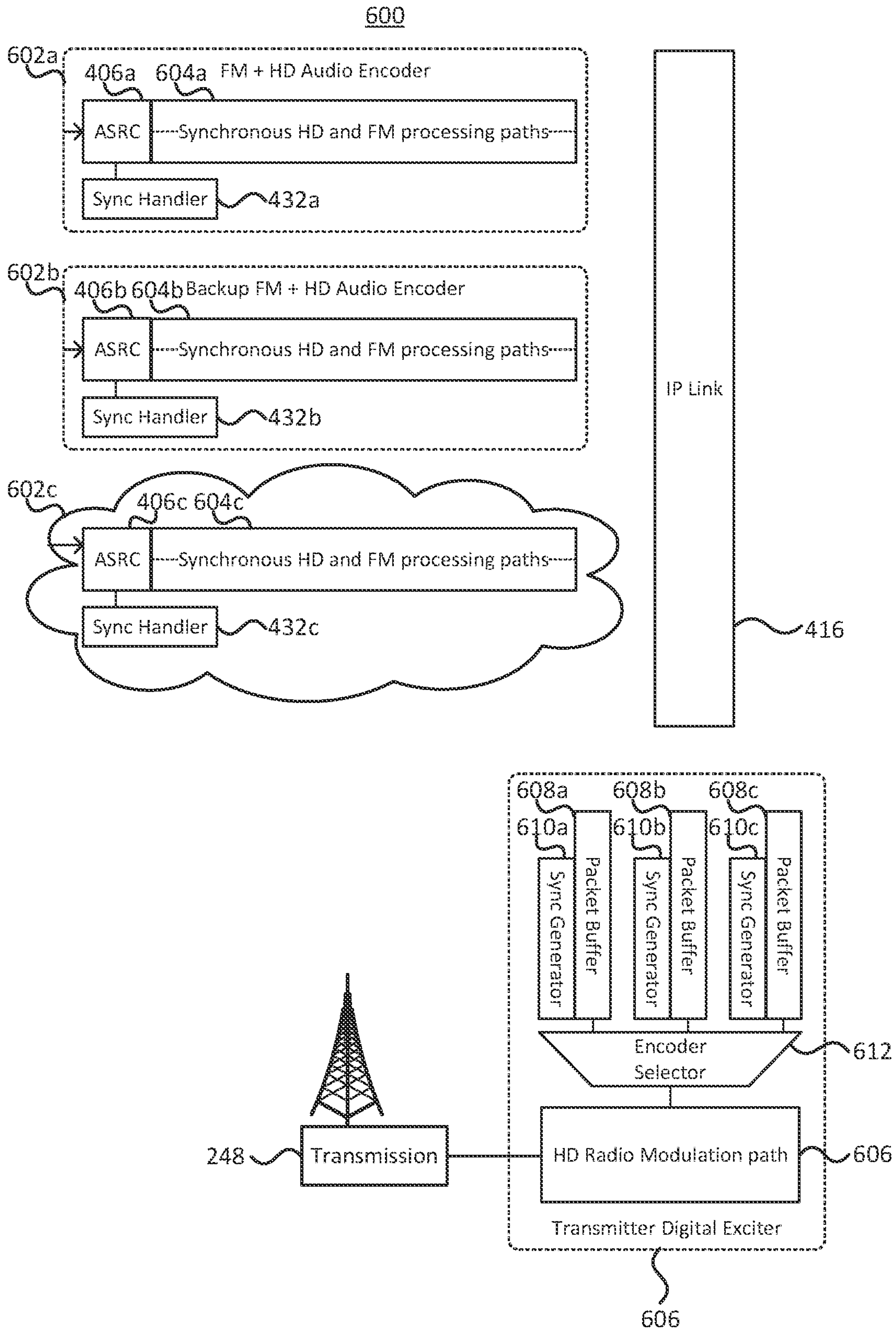
FIG. 6 depicts a further IBOC broadcast systems architecture with improved synchronization and buffering between multiple audio encoders.

FIG. 6 depicts a further IBOC broadcast systems architecture with improved synchronization across multiple encoders. The system 600 provides multiple different FM+HD encoders 602*a*, 602*b*, 602*c* (referred to collectively as encoders 602). Each of the encoders 602 are similar to those described above and as such are not described in further detail. The encoders may include various different encoders, possibly encoding the same or different audio. For example, encoder 602*a* may provide a main encoder and 602*b* may act as a backup encoder. Each of the encoders 602 may be located in the same location, such as on-premise in a studio, or possibly may be implemented on cloud-based compute resources such as depicted for encoder 602*c*. Each of the encoders 602 comprises a respective input sampler 406*a*, 406*b* 406*c* which samples the audio signal at an input rate which may be controlled at least in part by a sync handler 432*a*, 432*b*, 432*c*. Each of the encoders 602 comprise a synchronous processing paths for both HD and FM audio and transmit the encoded audio over the IP link 416 to the transmission exciter 606. The IP link 416 may be a dedicated IP link or may be provided over a public IP network such as the Internet.

The transmission exciter 606 comprises a plurality of packet buffers 608*a*, 608*b*, 608*c* (referred to collectively as buffers 610), with each being associated with a respective sync generator 610*a*, 610*b*, 610*c* (referred to collectively as sync generators 610). Each of the buffers 608 and sync generators 610 are associated with a respective one of the audio encoders 602. An encoder selector 612 is provided in order to select which of the audio encoders is provided to the HD radio modulation path 606 which generates the HD radio signal for transmission 248. Since each audio encoder is associated with its own buffer and sync generator, even if the inputs of the encoders run on different unrelated clocks, they will still follow the output. Although only a single output from the buffers 608 is provided to the modulation path 606, data is removed or consumed from each of the buffers equally. Additionally, if the packet buffers are controlled to phase/time align to fall on transmission frame boundaries it is possible to gracefully changeover the modulator and receiver to the other stream.

Although depicted as using a single modulation path 606 for a selected one of the buffers, it is possible to provide multiple modulation paths each associated with a respective packet buffer and sync generator. In such an embodiment the encoder selector would be replaced with a transmission signal selector placed after the modulation paths to select the modulated signal for transmission.

The use of the sync generators and sync handlers allows multiple input chains, or audio encoders, to be synchronized to a single output rate. It is possible to change over gracefully from one input to another as it all includes all broadcast content AND all inputs follow the output rate. Additionally, if the buffer is controlled such that the output produces symbols that are time/phase aligned between multiple inputs it is possible to achieve graceful and even seamless changeover from one HD input to another while keeping an HD receiver locked to the broadcast.

Figure 7:
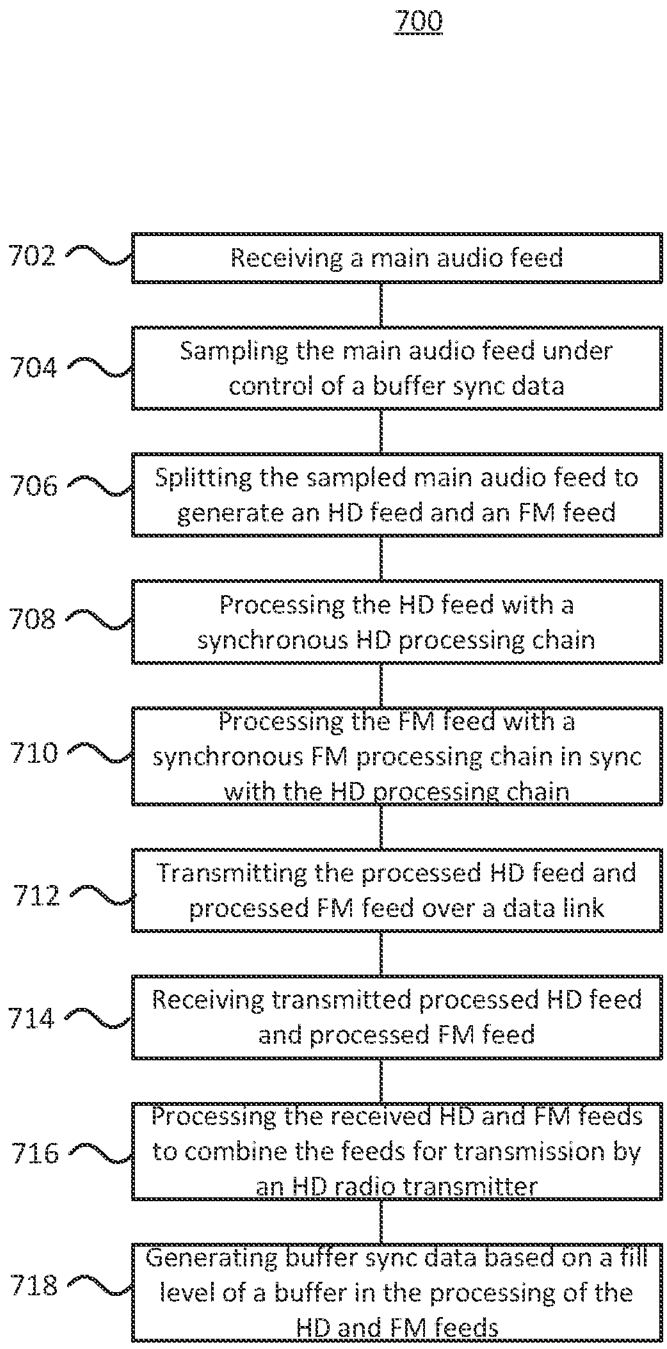
FIG. 7 depicts a method for synchronizing FM and HD1 audio signals.

FIG. 7 depicts a method for synchronizing FM and HD1 audio signals. The method 700 begins with receiving a main audio feed (702). The main audio feed comprises an audio signal that is to be broadcast on both the FM portion and the HD portion of the IBOC signal. Once received, the main audio feed is sampled under control of buffer sync data (704). The sampling of the main audio feed may be done by an ASRC operating at a rate that is determined at least in part by the buffer sync data. For example, the ASRC may sample the main audio feed at a base rate and depending upon the buffer sync data, the rate may be increased or decreased. Once the main audio feed is sampled, the sampled signal is split, or duplicated, to provide an HD feed and an FM feed (706). Once the sampled feed is split into the FM and HD feeds, each feed is processed in sync with each other. The HD feed is processed with a synchronous HD processing chain (708) and the FM feed is processed with a synchronous FM processing chain (710), with the two chains operating in sync with each other. The processed HD and FM data is transmitted to a transmitter of a data link (712), such as an IP link. The transmitted FM and HD signals are received at the transmitter (714) and processed including combining the FM and HD signals together (716) for transmission. The combined signals may be provided to a DAC operating at a particular rate. In order to ensure that the DAC does not overrun, or underrun, the sampled and split main audio feed, the data may be buffered and buffer sync data generated (718) based on the state of the buffer. The buffer sync data may be used to control, at least in part, the sampling rate of the audio feed.

Synchronizing the air chain by this method, opens more remote location possibilities of both the transmitter and the exporter/audio encoder, as the components do not have to be co-located to maintain good diversity delay as currently recommended by best practice (NRSC-G203, 2017), the entire contents of which are incorporated herein by reference in its entirety. Now the audio encoders can be centralized for a broadcaster lowering capital and operating expenditures. The audio encoder system can now be fully implemented as software components no longer requiring embedded hardware support.

Figure 8:
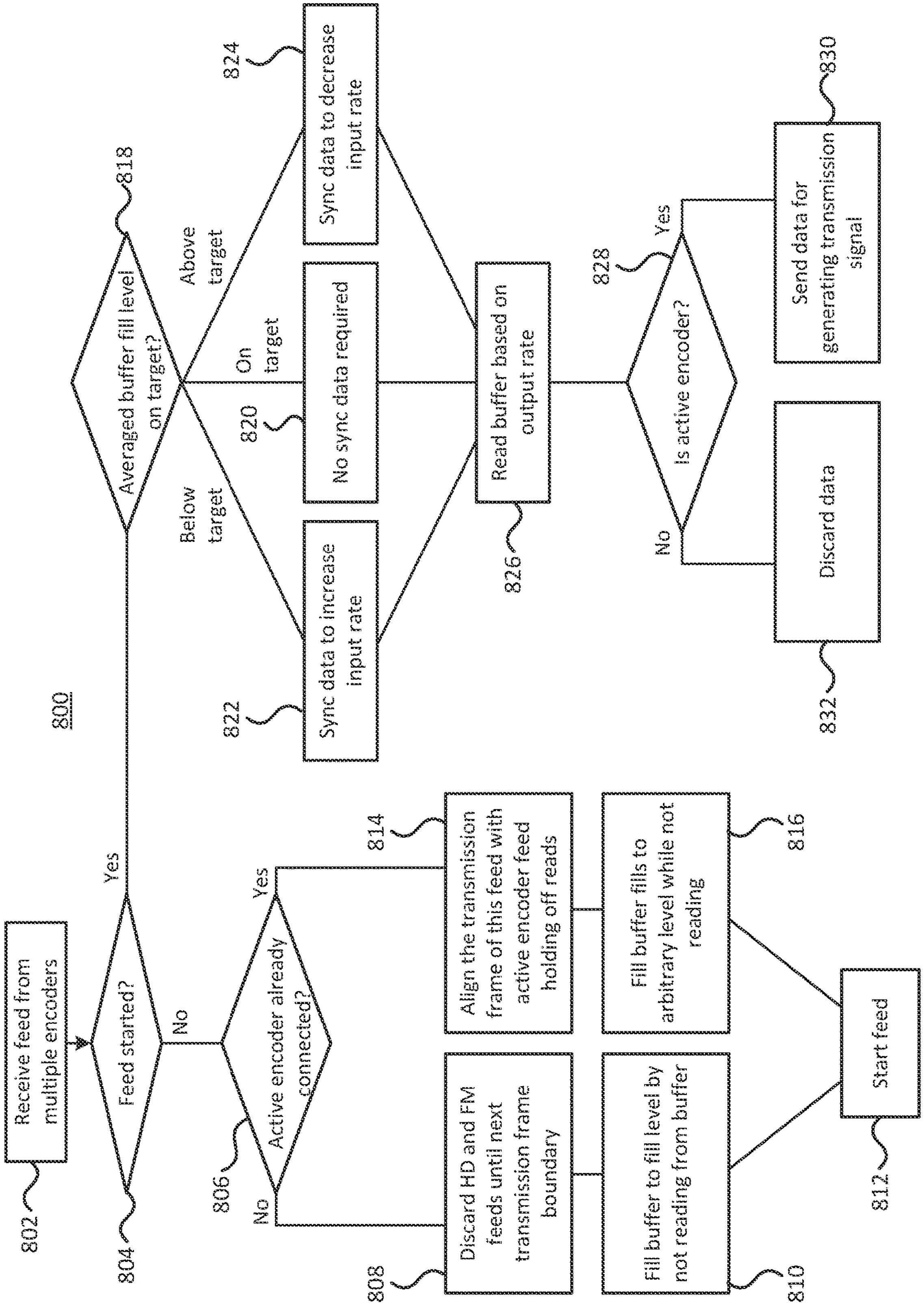
FIG. 8 depicts a method for synchronizing and buffering data feeds from multiple audio encoders.

FIG. 8 depicts a method for buffering and synchronizing HD and FM data feeds from multiple audio encoders. The method 800 may be implemented at a transmission exciter that is connected to multiple audio encoders, such as that depicted in FIG. 6. The method 800 may be performed for each connected encoder. The method 800 receives HD and FM feeds from one of multiple encoders (802). When initially receiving the processed FM and HD feed, the exciter determines if this specific input feed has already been started (804). If it has not been started (No at 804) it determines if there is currently another input feed that is active (806). If there is no active input feed and the transmitter exciter is idle (No at 806), the input feed is scanned for the L1 transmission frame boundary and both the FM and HD feed is discarded until it is found (808). Next the buffer specific to this input feed is filled to a target fill level (810) and once the buffer has reached the target fill level the feed is started (812). If there is already an existing active input feed (Yes at 806) the feed will be started as a standby input feed. The state of the active input feed is inspected to align the feed with the active encoder feed (814) and the current feed is buffered until the position within a transmission frame matches the active feed (816). The feed is then considered started (812). Note that an inactive feed may fill its buffer to a minimum fill rate to contain a full transmission frame before engaging in this process to ensure a minimum buffer level as this input feed may not have been transmission frame aligned with the active feed resulting in an arbitrary buffer variance over a transmission frame. Input rate control will over time fill the buffer to the desired target level so that a standby feed has the same buffer level as the active feed. If all buffers contain at least a transmission frame worth of data, changeover can occur at the beginning of a transmission frame making the change over graceful for both the modulator and HD Radio receiver.

If the feed is started (Yes at 804), the time averaged fill level of the buffer is inspected to determine if the fill level is on target (818). If the buffer is on target (On target at 818), no sync data is required to be sent to the input feed (820). If the buffer is below target (Below target at 818) sync data is generated to increase the input rate (822). If the buffer is above target (Above target at 818) sync data is generated to decrease the input rate (824). Note that sync data is specific to each input feed. All input feeds, whether active or inactive are read at the same rate based on the output rate (826), thus causing all input rates to operate at the same output rate. It is determined if the feed is the active feed (828) and if this feed is an active feed (Yes at 828), the feed is processed and the HD and FM feeds are combined for transmission by an HD radio transmitter (830). If the feed is inactive (No at 828), the read data is discarded (832).

The described method of synchronizing the audio encoder to the transmitter also lends itself to main/backup applications since the IP link traversal time is no longer significant and all broadcast content is contained in a single link definition. If the transmitter is forced to switch over to another encoder source it can be done seamlessly and the control loop will adapt to the new audio chain throttling its rate to the transmitter. Should a single encoder feed multiple transmitters like in a single frequency network (SFN), all transmitters must operate at the same clock rate via other synchronization means as the encoder ideally only pays attention to a single transmitter. This is also applicable to simulcasting the same audio across other types of media, such as Digital Audio Broadcasting (DAB), Digital Radio Mondial (DRM), or IP audio streaming. All these use cases benefit from a synchronous audio chain with a single ASRC input that can broadcast from a single transmitter as possible for DRM Simulcast. If the simulcast is on a different frequency band several transmitters may be required similar to the SFN example above. For example, FM and DRM may be simulcast on a VHF Band II transmitter and another digital simulcast can be over DAB on a VHF Band III transmitter. A FM receiver may switch to the DRM Simulcast which may then switch over to the DAB simulcast. All benefit from a single head end audio encoder for all systems.

The architecture described herein may be used for cloud delivered audio encoders as tight timing tolerance to the strict IBOC timing specifications cannot natively be guaranteed in all cloud based data centers whether these data centers are public or private. Particularly, for a public data center a bi-directional IP link is beneficial as it provides security benefits. The transmitter can be placed behind a firewall and it can reach out to the audio encoder following a more traditional Internet connectivity model than today feed forward system. The audio encoder can identify itself through custom or industry standard private/public key exchange ensuring that the correct audio encoder broadcasts its signal on air.

The various components described above may be implemented by configuring a computer or server and/or on application specific integrated circuits (ASICs) and/or field programmable gate arrays (FPGAs) or other combinations of hardware, firmware and software.

As is readily apparent, numerous modifications and changes may readily occur to those skilled in the art, and hence it is not desired to limit the invention to the exact construction and operation shown and described, and accordingly all suitable modification equivalents may be resorted to falling within the scope of the invention as claimed.

What is claimed is:

1. A HD radio broadcast system comprising:

an audio encoder comprising:

an input sampler operating at a controllable input rate, the sampled input audio feed used to generate two audio signals for synchronous processing by respective synchronous audio processing paths; and a transmitter for transmitting two audio streams from the output of the synchronous audio processing paths over a data link;

a transmitter exciter comprising:

first and second modulators each for modulating respective audio streams from the two audio streams transmitted over the data link;

an output device operating at an output rate to output a transmission signal based on a combination of the modulated two audio streams; and a buffer for the two audio streams, wherein no samples are added to or removed from the two audio streams between the input sampler and when the two streams are combined together, and wherein a state of the buffer is used to control the input rate of the audio encoder.

2. The broadcast system of claim 1, wherein the audio encoder further comprises an audio splitter for generating the two audio signals from the output of the input sampler.

3. The broadcast system of claim 1, wherein the two synchronous audio processing paths comprising an FM audio processing path and an HD audio processing path.

4. The broadcast system of claim 3, wherein the FM audio processing path comprises an FM audio processor and an FM encoder.

5. The broadcast system of claim 4, wherein the FM audio processing path further comprises an FM MPX generator.

6. The broadcast system of claim 3, wherein the HD audio processing path comprises an HD audio processor and an HD encoder.

7. The broadcast system of claim 6, wherein the HD audio processing path further comprises a data multiplexor.

8. The broadcast system of claim 1, wherein the data link comprises an internet protocol (IP) link.

9. The broadcast system of claim 1, wherein the audio encoder further comprises a sync handler receiving sync data from the transmitter exciter, the sync handler controlling the input rate of the sampler based on the sync data.

10. The broadcast system of claim 1, wherein the transmitter exciter further comprises a sync generating for generating and transmitting the sync data based on the state of the buffer.

11. The broadcast system of claim 1, wherein the first and second modulators comprise in-phase quadrature (IQ) modulators.

12. The broadcast system of claim 11, wherein the transmitter exciter further comprises a combiner for combining the two modulated audio streams.

13. The broadcast system of claim 12, wherein the combiner combines the two modulated audio streams using a peak-to-average power reduction (PAPR) process.

14. The broadcast system of claim 12, wherein the buffer is located before the first and second modulators.

15. The broadcast system of claim 12, wherein the buffer is located between the first and second modulators and the combiner.

16. The broadcast system of claim 12, wherein the buffer is located after the combiner.

17. The broadcast system of claim 1, wherein the first modulator comprises an IBOC modulator and the second modulator comprises an FM modulator.

18. The broadcast system of claim 1, wherein the FM processing path further comprises a diversity delay buffer.

19. The broadcast system of claim 1, wherein the output device comprises a digital to analog converter (DAC).

20. The broadcast system of claim 1, further comprising:

one or more additional audio encoders each having a respective input sampler operating at a controllable input rate; and wherein the transmitter exciter further comprises:

a respective buffer and sync generator for each of the one or more additional audio encoders; and an encoder selector for selecting an encoder feed for modulating.

21. The broadcast system of claim 20, wherein the buffer of the audio encoder and the buffers of the one or more additional audio encoders are controlled such as to align transmission frames to an active audio encoder to allow for graceful changeover.

* * * * *